United States Patent [19]

Leboime

[11] Patent Number: 4,784,232

[45] Date of Patent: Nov. 15, 1988

[54] TRANSMISSION FOR A WHEEL- OR TRACKTYPE VEHICLE COMPRISING A BRAKING DEVICE AND A STEERING UNIT

[75] Inventor: Pierre R. Leboime, Paris, France

[73] Assignee: SO.M.A. Europe Transmissions, Asnieres, France

[21] Appl. No.: 933,198

[22] Filed: Nov. 19, 1986

[30] Foreign Application Priority Data

Nov. 20, 1985 [FR] France ................. 85 17169

[51] Int. Cl.[4] ........................................... B62D 11/08
[52] U.S. Cl. .................................................. 180/6.2
[58] Field of Search ............... 74/843; 192/4 R, 12 R, 192/13 R; 180/6.2

[56] References Cited

U.S. PATENT DOCUMENTS

| 4,493,385 | 1/1985 | Shiber ................................. | 180/6.2 |
| 4,494,621 | 1/1985 | Nagata ................................ | 180/6.2 |
| 4,497,218 | 2/1985 | Zaunberger ........................ | 180/6.2 |

Primary Examiner—Charles T. Jordan
Assistant Examiner—Richard L. Klein
Attorney, Agent, or Firm—Stevens, Davis, Miller & Mosher

[57] ABSTRACT

Disclosed is a transmission having an input shaft coupled to a motor unit on one side of the transmission and a braking device located on the other side of the unit. Planetary gear trains are located together on one side of the gear box with shafts coupled to the drive wheels or tracks extending through the braking unit on one side and through the gear box on the other. The gear box is connected to the planetary gear train by an output shaft and housing which is also connected to the braking device. Finally, a steering device is located within the transmission housing and serves to controllably interconnect the planetary gear of the planetary gear trains. This advantageously permits the brake unit to be mounted outside of the transmission housing which includes the planetary gear trains, the gear box and the steering device.

6 Claims, 3 Drawing Sheets

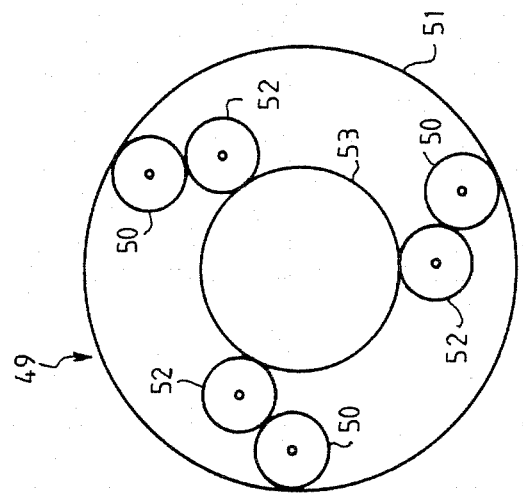
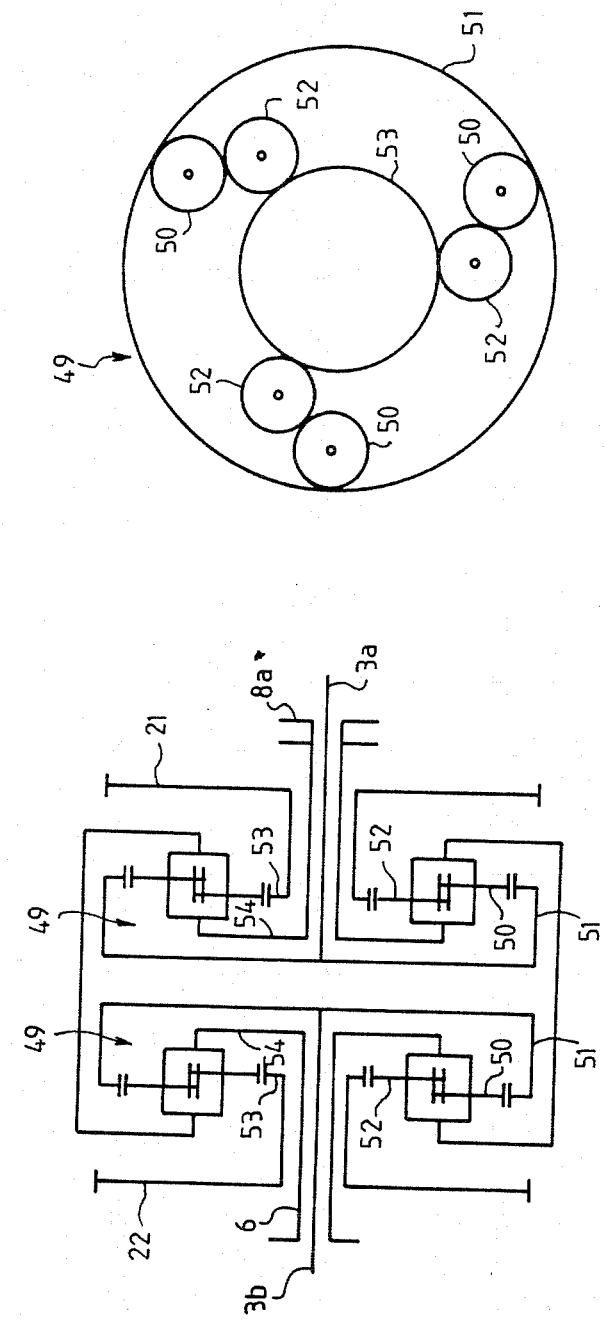

ular positioning within such transmissions, they make the motor-transmission coupling difficult and thus form an obstacle to an arrangement of the motor unit parallel to the right and left output shafts, which is a disadvantage for the manufacturers who generally have only a very confined space available to install the transmissions and motors in the vehicles.

TRANSMISSION FOR A WHEEL- OR TRACKTYPE VEHICLE COMPRISING A BRAKING DEVICE AND A STEERING UNIT

BACKGROUND OF THE INVENTION

The present invention relates to a transmission for a vehicle with propelling means, such as wheels or tracks, on each of the longitudinal sides thereof, said transmission comprising a right output shaft and a left output shaft coupled to the propelling means, a gear box with input and output shafts respectively coupled to a motor unit and to the right and left output shafts, a braking device which can reduce the rotational speed of the right and left output shafts and a steering unit comprising a shaft with, fitted thereon, a first and a second pinions, a third pinion engaged with the first pinion, and two planetary gear trains coaxial with the right and left output shafts, including each a planetary gear, a ring gear, planet wheels and a planet carrier and controlled by the second and third pinions for varying the rotational speeds of the right and left output shafts with respect to each other and thus changing the vehicle direction.

The planetary gear trains and the brakes in the transmissions of this type are located on either side of the gear box, in the vicinity of the longitudinal walls of the vehicles. In fact, because of their particular positioning within such transmissions, they make the motor-transmission coupling difficult and thus form an obstacle to an arrangement of the motor unit parallel to the right and left output shafts, which is a disadvantage for the manufacturers who generally have only a very confined space available to install the transmissions and motors in the vehicles.

SUMMARY OF THE INVENTION

The object of the present invention is to remedy such a disadvantage and, to this effect, it is directed to a transmission of the above mentioned type, characterized in that the input shaft of the gear box is coupled to the motor unit through a coupling mechanism extending along one of the longitudinal sides of the vehicle, in that the braking device is located in the vicinity of the other longitudinal side of the vehicle and comprises a rotating part coaxial with the right and left output shafts, and in that the planetary gear trains are disposed back to back between the gear box and the braking device, with their planet carriers integral with each other and coupled one to the output shaft of the gear box and the other to the rotating part of the braking device, while their ring gears are respectively coupled to the right and left output shafts, one through the rotating part of the braking device and the other through the gear box, and their planetary gears are rotatably integral with toothed wheels, respectively engaged with the third and second pinions.

The transmission according to the invention has such a structure that its motor unit can now be installed parallel to the right and left output shafts, in the close vicinity of one of the longitudinal walls of the vehicle. It thus provides the manufacturers with an additional means for solving the problem raised by the little space available on certain vehicles to accommodate the transmission and the motor.

Preferably, the gear box, the right and left output shafts, the steering unit and the coupling mechanism are accommodated in a main casing, while the braking device is either located externally or accommodated in an auxiliary casing carried by the main casing.

As the braking device is located outside the main housing, very easy access is of course provided for carrying out its maintenance.

The motor coupling mechanism is advantageously formed by a set of pinions the rotation axes of which are parallel to the right and left output shafts, and contributes, in turn, to increase the size of the space intended for the motor unit.

In some cases, the transmission according to the present invention comprises preferably step-up planetary gear trains, that is to say with a single set of planet wheels meshing both with their planetary gear and ring gear.

In other cases, it is on the contrary desirable that the planetary gear trains be step-down planetary gear trains having two sets of planet wheels meshing some with their planetary gear and some with their ring gear, the planet wheels of one set further meshing with those of the other set.

To build vehicles at better cost, it may be judicious to equip their transmission with a steering unit comprising a large turning-radius brake and a small turning-radius brake, these two brakes being advantageously located externally or housed in a third casing carried by the main casing, in the vicinity of the braking device.

BRIEF DESCRIPTION OF THE DRAWINGS

Two embodiments of the present invention will be described hereafter by way of example with reference to the accompanying drawings, in which :

FIG. 3 is a schematic view of an alternative embodiment of the two planetary gear trains used in the transmissions shown on FIGS. 1 and 2 ; and FIG. 4 is a schematic side view of one of the planetary gear trains visible on FIG. 3.

Figure 1:
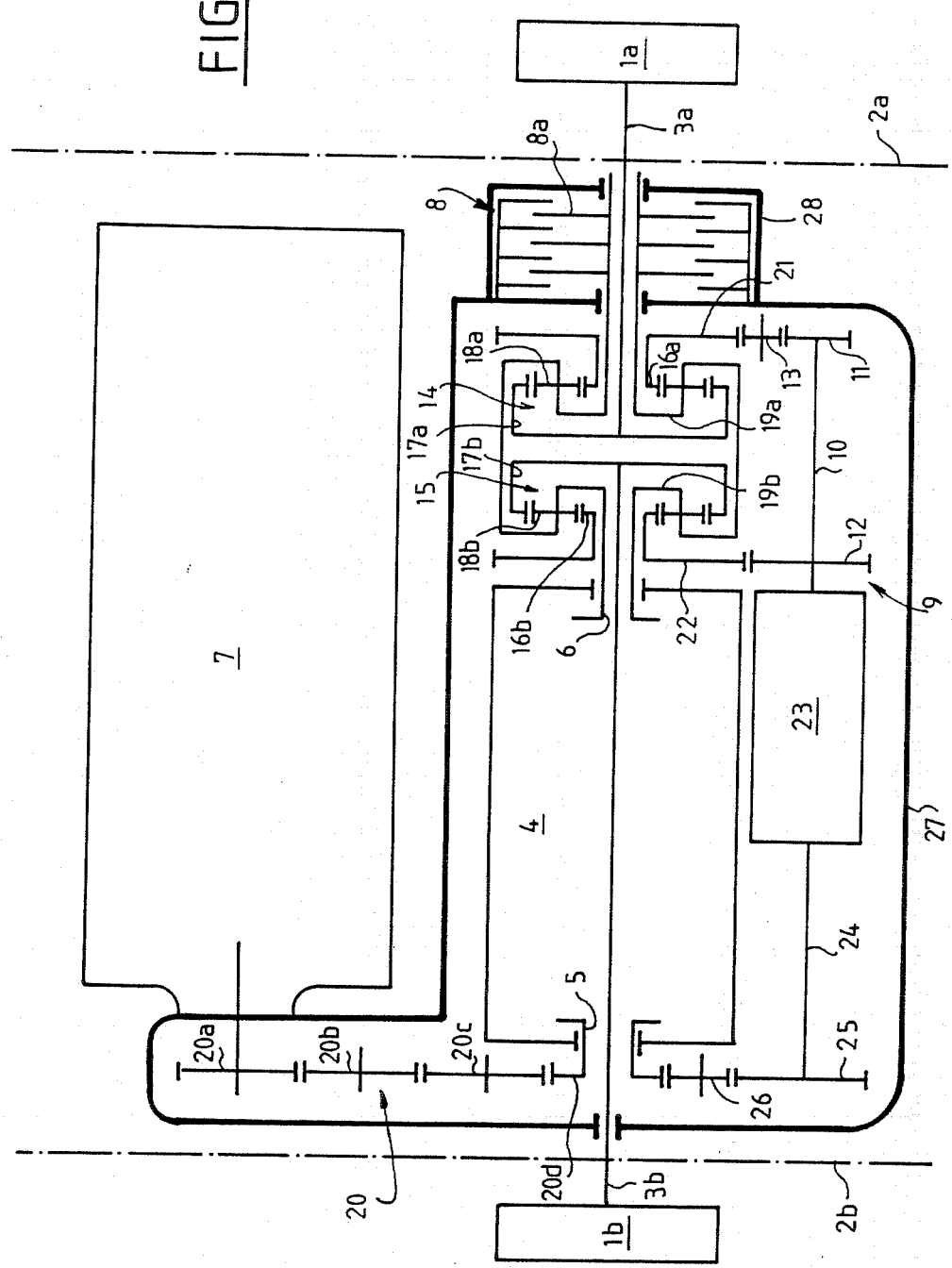
FIG. 1 is a schematic view of a transmission according to a first embodiment.

The transmission shown on FIG. 1 has been developed to equip a vehicle having propelling means 1a, 1b, such as wheels or tracks with their step-down gears, on each of the longitudinal sides 2a, 2b thereof.

In a manner known in itself, it comprises a right output shaft 3a and a left output shaft 3b respectively coupled to the propelling means 1a, 1b, a gear box 4 comprising an input shaft 5 and an output shaft 6 respectively coupled to a motor unit 7 and to the output shafts 3a and 3b, a braking device 8 which can reduce the rotational speed of the output shafts 3a and 3b, and a steering unit 9 comprising a shaft 10 with, fitted thereon, two pinions 11 and 12, a third pinion 13 engaged with the pinion 11 and two planetary gear trains 14, 15 coaxial with the output shafts 3a, 3b and including each a planetary gear 16a, 16b, respectively, a ring gear 17a, 17b, respectively, planet wheels 18a, 18b, respectively, and a planet carrier 19a, 19b, respectively, whereby the planetary gear trains 14, 15 are respectively controlled by the pinions 13 and 12 for varying the rotational speeds of the output shafts 3a, 3b with respect to each other and thus changing the direction of the vehicle.

To permit the installation of the motor unit 7, for example, a gas turbine or a piston engine, parallel to the output shafts 3a and 3b, the input shaft 5 of the gear box 4 is coupled to the motor unit 7 through a coupling mechanism 20 extending along the longitudinal side 2b of the vehicle. Besides, the braking device 8 is located in the vinicity of the longitudinal side 2a of the vehicle and has a rotating part 8a coaxial with the output shafts 3a, 3b, while the planetary gear trains 14, 15 are disposed back to back between the gear box 4 and the braking device 8. Namely, the planet carriers 19a, 19b are integral with each other and coupled the first one to the rotating part 8a of the braking device and the second one to the output shaft 6 of the gear box 4. The ring gears 17a, 17b are for their part respectively coupled to the output shafts 3a and 3b, the first one through the rotating part 8a of the braking device and the second one through the gear box 4. As for the planetary gears 16a, 16b, they are rotatably integral with toothed wheels 21, 22 respectively engaged with the pinions 13 and 12.

In the examplary embodiment shown on FIG. 1, the coupling mechanism 20 is formed by a set of 4 pinions 20a, 20b, 20c, 20d meshing together and the rotation axes of which are parallel to the output shafts 3a, 3b.

The pinion 20d of this set is fitted on the input shaft 5 of the gear box 4. It will be understood, however, that this pinion could be coupled to the shaft 5 through a resilient coupling, a torque converter or a clutch without departing from the present invention.

It is to be noted here that the number of the pinions of the coupling mechanism 20 is not imposed and could be different from 4, should technical considerations so require.

Concerning the steering unit 9, it is to be pointed out that in the example illustrated on FIG. 1, its shaft 10 is not different from the output shaft of a hydrostatic assembly 23, the input shaft 24 of which carries a pinion 25 meshing with a pinion 26 meshing itself with the pinion 20d. Of course, the coupling between the pinion 25 and the engine could be different from the one illustrated on FIG. 1. Thus, the pinion 26 could, for example, be replaced by at least two pinions coupling the pinions 25 and 20d or 25 and 2a, 2b or 20c.

Moreover, it must be noted that the gear box 4, the output shafts 3a and 3b, the steering unit 9 and the coupling mechanism 20 are accommodated in a main casing 27, while the braking device 8 is housed in an auxiliary casing 28 carried by casing 27.

As the braking device is located outside the main casing, it thus provides very easy access for an operator in charge of its maintenance to carry out his work.

For a complete description, it must be further indicated that the braking device 8, owing to the fact it is external to the main casing 27, could operate dry, the casing 28 being possibly suppressed, or in a fluid identical to or different from the one normally contained in the main casing.

Figure 2:
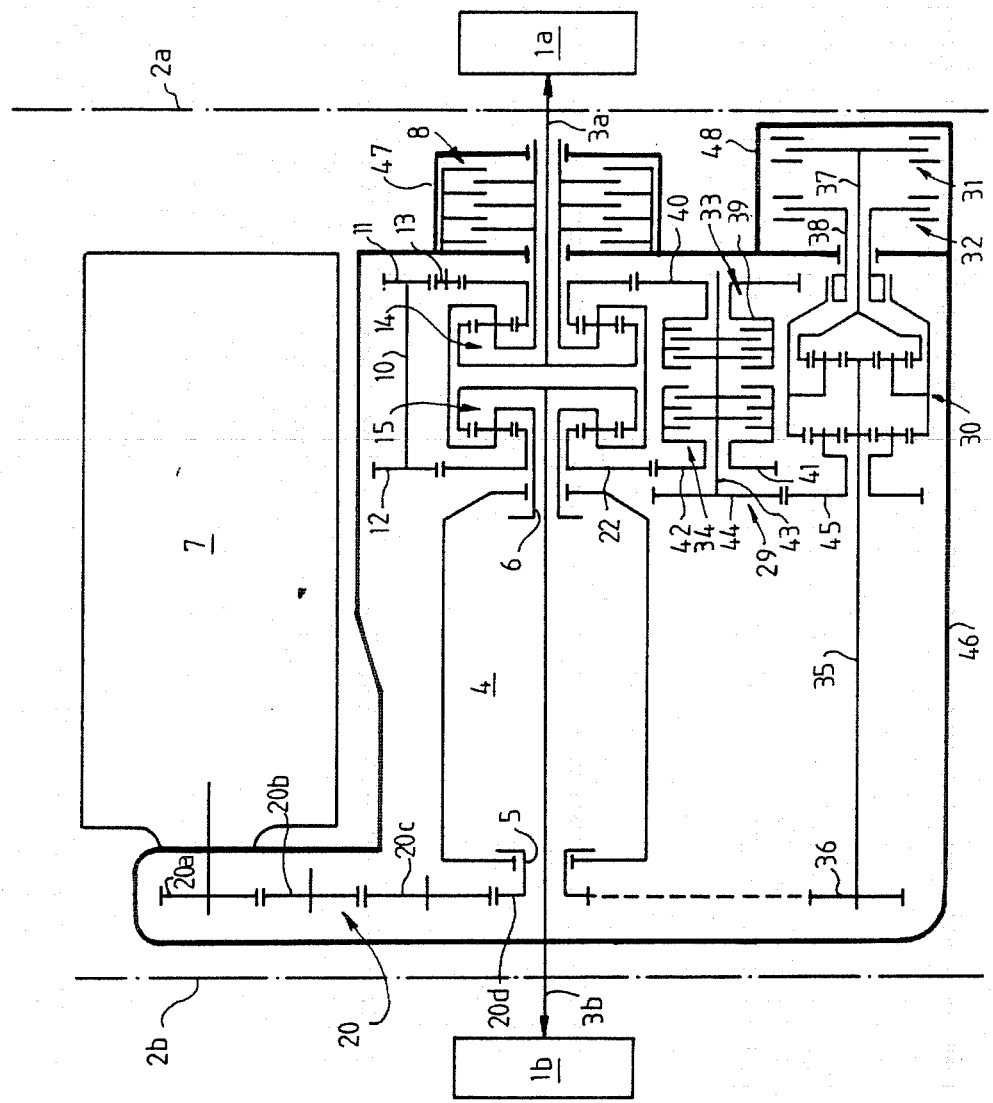
FIG. 2 is a schematic view of a transmission according to a second embodiment.

The transmission shown on FIG. 2 differs from the one described above in that it incorporates a steering unit 29 which, instead of a hydrostatic assembly, such as the one designated in 23 on FIG. 1, comprises a mechanical assembly including an auxiliary gear box 30, a large turningradius brake 31, a small turning-radius brake 32 and two clutches 33 and 34.

The auxiliary gear box 30 has an input shaft 35 with, fitted thereon, a pinion 36 rotatably integral with the pinions of the coupling mechanism 20, to control members 37, 38 respectively coupled to the brakes 31 and 32 and an output through a toothed wheel 45.

As for the clutches 33 and 34, they comprise, for the first one, a rotating part 39 provided with a pinion 40 meshing with the toothed wheel 21 of the planetary gear 16a of the gear train 14 and, for the second one, a rotating part 41 provided with a pinion 42 meshing with the toothed wheel 22 of the planetary gear 16b of the gear train 15. They further have a common shaft 43 carrying a pinion 44 which meshes with the toothed wheel 45 forming the output of the auxiliary gear box.

Like in the transmission represented on FIG. 1, the gear box 4, the output shafts 3a and 3b, the steering unit 29 and the coupling mechanism 20 are housed in a main casing 46, while the braking device 8 can be accommodated in an auxiliary casing 47 carried by the main casing.

The brakes 31 and 32 can, for their part, be housed in a third casing 48 carried by the main casing 46, in the vicinity of the braking device 8 and can thus be of the type operating dry or of the type operating in a liquid, which, besides, could be identical or different from the one normally contained in the main casing.

The planetary gear trains 14 and 15 of the transmissions represented on FIGS. 1 and 2 are step-up planetary gear trains since they comprise a single set of planet wheels meshing both with their planetary gear and ring gear.

These step-up gear trains, however, could be replaced by stepdown gear trains 49, such as those represented on FIGS. 3 and 4 and comprising a first set of planet wheels 50 meshing with their ring gear 51 and a second set of planet wheels 52 meshing with their planetary gear 53, the planet wheels 50 and 52 meshing together and being carried by a planet carrier 54 (shown on FIG. 3 only) ; such replacement will of course be considered as being within the scope of the present invention.

Finally, it will be noted that, should space problems be encountered, the motor unit 7 could be positioned parallel to the longitudinal sides 2a, 2b of the vehicle by interposing a bevel gear between same and the coupling mechanism 20.

What is claimed is:

1. In a vehicle with propelling means, such as wheels or tracks, on each of the longitudinal sides thereof, a transmission comprising a right output shaft and a left output shaft coupled to the propelling means, a gear box with input and output shafts respectively coupled to a motor unit and to the right and left output shafts, a braking device which can reduce the rotational speed of the right and left output shafts, and a steering unit comprising a shaft with, fitted thereon, a first and a second pinions, a third pinion engaged with the first pinion, and two planetary gear trains coaxial with the right and left output shafts, including each a planetary gear, a ring gear, planet wheels and a planet carrier and controlled by the second and third pinions for varying the rotational speeds of the right and left output shafts with respect to each other and thus changing the vehicle direction, characterized in that the input shaft of the gear box is coupled to the motor unit through a coupling mechanism extending along one of the longitudinal sides of the vehicle, in that the braking device is located in the vicinity of the other longitudinal side of the vehicle and comprises a rotating part coaxial with the right and left output shafts, and in that the planetary gear trains are disposed back to back between the gear box and the braking device, with their planet carriers integral with each other and coupled onto to the output shaft of the gear box and the other to the rotating part of the braking device, while their ring gears are respectively coupled to the right and left output shafts, one through the rotating part of the braking device and the other through the gear box, and their planetary gears are rotatably integral with toothed wheels respectively engaged with the third and second pinions, the gear box, the right and left output shafts, the steering unit and the coupling mechanism are accommodated in a main casing, while the braking device is accommodated in an auxiliary casing carried by the main casing.

2. The transmission according to claim 1, characterized in that the coupling mechanism is formed by a set of pinions the rotation axes of which are parallel to the right and left output shafts.

3. The transmission according to any one of claims 1 or 2, characterized in that the planetary gear trains have a single set of planet wheels meshing both with their planetary gear and ring gear.

4. The transmission according to any one of claims 1 or 2, characterized in that the planetary gear trains have two sets of planet wheels meshing some with their planetary gear and some with their ring gear, the planet wheels of one set further meshing with those of the other set.

5. The transmission according to any one of claims 1 or 2, characterized in that the steering unit comprises, among others, a large turning-radius brake and a small turning-radius brake.

6. The transmission according claim 5, characterized in that the large and small turning-radius brakes are housed in a third casing carried by the main casing in the vicinity of the braking device.

* * * * *